Jan. 29, 1963     W. L. LANZONE     3,075,602
AUXILIARY BRAKE PEDAL FOR A VEHICLE
Filed Oct. 23, 1961
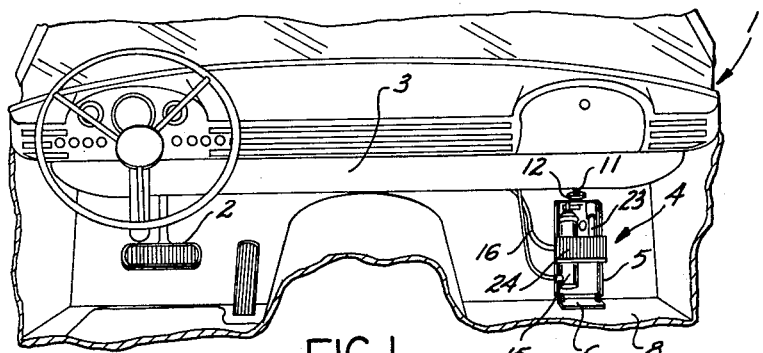
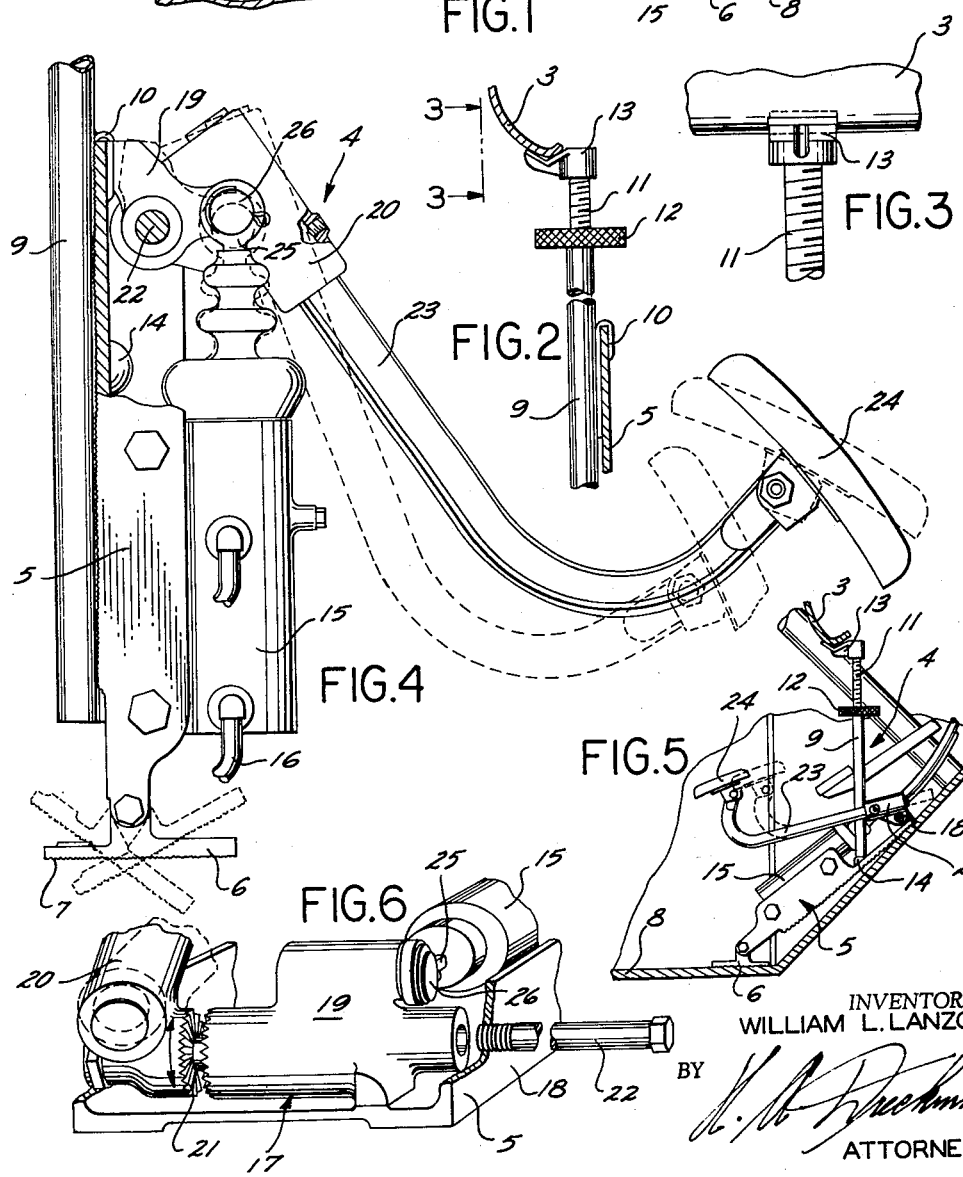
INVENTOR.
WILLIAM L. LANZONE
BY
ATTORNEY United States Patent Office 3,075,602
Patented Jan. 29, 1963

3,075,602
AUXILIARY BRAKE PEDAL FOR A VEHICLE
William L. Lanzone, 1530 W. 31st St., Long Beach, Calif.
Filed Oct. 23, 1961, Ser. No. 146,880
8 Claims. (Cl. 180—77)

This invention relates to an auxiliary brake pedal for a vehicle and is intended for use on the passenger side of the front seat of an automobile, especially where the automobile is being used to instruct learners. This device mounts a brake pedal so that the instructor can stop the car in an emergency.

An object of my invention is to provide a novel auxiliary brake pedal which can be quickly and easily mounted on the passenger side of the front seat, and which is wedged between the floor of the vehicle and the instrument panel, thus fixedly mounting the brake pedal for convenient use.

Another object of my invention is to provide a novel auxiliary brake pedal of the character stated, in which the pedal can be adjusted relative to its mounting plate to accommodate the user, and also to permit adjustment of the pedal relative to the size and shape of the vehicle upon which it is mounted.

Still another object of my invention is to provide a novel auxiliary brake pedal of the character stated in which the pedal, the operating hydraulic cylinder, and the mounting plate are all assembled in a unit for convenience of mounting and removal.

Other objects, advantages and features of invention may appear from the accompanying drawing, the subjoined detailed description and the appended claims.

In the drawing

FIGURE 1 is a transverse sectional view of a vehicle with my auxiliary brake pedal mounted therein.

FIGURE 2 is a fragmentary side elevation of the mounting screw.

FIGURE 3 is a fragmentary side elevation taken from line 3—3 of FIGURE 2.

FIGURE 4 is a side elevation of my auxiliary brake pedal.

FIGURE 5 is a side elevation of my brake pedal illustrating another position of the pedal.

FIGURE 6 is a fragmentary disassembled view of the pivot portion of my auxiliary brake pedal.

Referring more particularly to the drawing, the numeral 1 indicates the front driving compartment of a vehicle, which includes the usual and well known braking apparatus 2 on the driver's side of the front seat. An instrument panel 3 extends transversely across the vehicle and is also usual and well known in the art. When a learner is being instructed in the technique of driving a vehicle the instructor is seated on the passenger side, and in order to stop the vehicle in an emergency I provide an auxiliary removable brake pedal 4 which is constructed and removably mounted on the vehicle as follows: The brake pedal consists of a mounting plate 5 which has a floor engaging foot 6 pivotally mounted on the lower end thereof. This foot is toothed or serrated on the bottom thereof as shown at 7, so that when it engages the floor 8 of the vehicle it will be securely anchored and will not slip when the brake pedal is being used. The mounting plate 5 is wedged between the floor 8 and the instrument panel 3 by means of a tube 9, which has a hook 10 fixedly attached thereto. The hook 10 fits over the top of the mounting plate 5, as shown in FIGURES 2 and 4. A threaded post 11 fits into the tube 9 and can be adjusted lengthwise within the tube by means of the nut 12 which screws onto the post 11. A finger 13 on the upper end of the post 11 is shaped to fit against the bottom edge of the instrument panel 3, thus enabling the mounting plate 5 to be wedged securely by the foot 6 which bears against the floor 8 of the vehicle, and by the finger 13 which presses against the bottom edge of the instrument panel 3. The nut 12 can be tightened securely to hold the parts wedged in this position.

As previously described, the tube 9 is attached to the mounting plate 5 by means of the hook 10. With some types of vehicles the plate 5 might have to be otherwise positioned; for example, as shown in FIGURE 5 one end of the plate 5 may rest upon an inclined portion of the floor of the vehicle. In this position the lower end of the tube 9 fits over a lug or nubbin 14 which is integrally formed on the plate 5 as shown. The tube 9 can be similarly elongated to press the plate 5 against the floor of the vehicle, the upper end of the wedge assembly consisting of the threaded post 11 and the finger 13, as previously described.

An operating cylinder 15 is fixedly attached to one side of the plate 5 and this operating cylinder has suitable hydraulic pipes 16 extending therefrom which are attached to the hydraulic brake system of the vehicle, so that when the brake cylinder 15 is actuated the brakes of the car will function.

An operating sleeve 17 is journaled between the flanges or ears 18 of the plate 5. The actuating sleeve 17 is formed in two parts, namely, an eccentric 19 and a pedal mounting tube 20. The eccentric 19 and the pedal tube 20 are adjustable relative to each other, and their engaging faces are toothed as shown at 21, so that the pedal mounting tube 20 can be adjusted around the longitudinal center line of the sleeve 17 to accommodate the user. The adjustment of the brake pedal is accomplished by loosening the long assembly bolt 22 which extends through the eccentric 19 and through the tube 20, and also acts as a journal around which the sleeve 17 rotates. The brake pedal shank 23 fits in the tube 20 and can be moved longitudially through this tube to any desired adjusted position, and also can be be rotated if desired to properly position the brake pedal 24, which is pivotally attached to the lower end of the shank 23.

The eccentric 19 is pivotally secured to the piston rod 25 of the operating cylinder 15 by means of the pin 26. Thus when the brake pedal 24 is stepped upon the sleeve 17 will rotate, thus actuating the operating cylinder 15 and applying the brakes.

In operation

The mounting plate 5 is placed in the passenger compartment of the vehicle and the foot 6 rests on the floor 8 in the desired location. The tube 9 is now either hooked over the back portion of the plate 5 by the hook 10, or the tube 9 can rest against the nubbin 14. The threaded rod 11 is now moved lengthwise from the tube 9 by means of the nut 12 until the finger 13 tightly engages the lower edge of the instrument panel 3. This clamps the mounting plate 5 securely in position and the plate is wedged between the floor 8 and the instrument panel 3. The foot pedal shank 23 can now be adjusted lengthwise within the mounting tube 20 as required, and when pressure is applied to the pedal 24 the sleeve 17 will rotate on the bolt 22, thus rotating the eccentric 19 and actuating the operating cylinder 15 through the bolt 26 which engages the piston rod 25. The shank 23 of the brake pedal can also be adjusted around the longitudinal center line of the bolt 22 by loosening that bolt and then rotating the mounting sleeve 20 to the desired position, after which the teeth 21 are re-engaged by tightening the bolt 22.

Having described my invention, I claim:

1. An auxiliary brake pedal for a vehicle having a floor and an instrument panel, comprising;
   a mounting plate,
   a foot mounted on said mounting plate and resting on the floor,
   adjustable wedging means, one end of the wedging means engaging the mounting plate and the other end engaging the instrument panel,
   a sleeve rotatably mounted on the mounting plate,
   a brake pedal on said sleeve,
   a hydraulic operating cylinder on the mounting plate and conduits extending from the cylinder to the vehicle brake,
   an eccentric on said sleeve,
   and linkage means extending from the eccentric to the hydraulic operating cylinder.

2. An auxiliary brake pedal for a vehicle having a floor and an instrument panel, comprising;
   a mounting plate,
   a foot mounted on said mounting plate and resting on the floor,
   a tube, one end of the tube engaging the mounting plate,
   a threaded rod, slidably mounted in said tube,
   a nut on the threaded rod engaging the tube,
   a finger on said threaded rod engaging the instrument panel,
   a sleeve rotatably mounted on the mounting plate,
   a brake pedal on said sleeve,
   a hydraulic operating cylinder on the mounting plate and conduits extending from the cylinder to the vehicle brake,
   an eccentric on said sleeve,
   and linkage means extending from the eccentric to the hydraulic operating cylinder.

3. An auxiliary brake pedal for a vehicle having a floor and an instrument panel, comprising;
   a mounting plate,
   a foot mounted on said mounting plate and resting on the floor,
   adjustable wedging means, one end of the wedging means engaging the mounting plate and the other end engaging the instrument panel,
   a sleeve rotatably mounted on the mounting plate,
   said sleeve including an eccentric and a pedal tube,
   means coupling said pedal tube and eccentric for rotatable adjustment,
   a brake pedal fitted in said pedal tube,
   a hydraulic operating cylinder on the hydraulic plate and conduits extending from the cylinder to the vehicle brake,
   and linkage means extending from the eccentric to the hydraulic operating cylinder.

4. An auxiliary brake pedal for a vehicle having a floor and an instrument panel, comprising;
   a mounting plate,
   a foot mounted on said mounting plate and resting on the floor,
   a tube, one end of the tube engaging the mounting plate,
   a threaded rod, slidably mounted in said tube,
   a nut on the threaded rod engaging the tube,
   a finger on said threaded rod engaging the instrument panel,
   a sleeve rotatably mounted on the mounting plate,
   said sleeve including an eccentric and a pedal tube,
   means coupling said pedal tube and eccentric for rotatable adjustment,
   a brake pedal fitted in said pedal tube,
   a hydraulic operating cylinder on the hydraulic plate and conduits extending from the cylinder to the vehicle brake,
   and linkage means extending from the eccentric to the hydraulic operating cylinder.

5. An auxiliary brake pedal for a vehicle having a floor and an instrument panel, comprising;
   a mounting plate,
   a foot mounted on said mounting plate and resting on the floor,
   adjustable wedging means, one end of the wedging means engaging the mounting plate and the other end engaging the instrument panel,
   a sleeve rotatably mounted on the mounting plate,
   said sleeve including an eccentric and a pedal tube,
   teeth on the engaging faces of the pedal tube and the eccentric for rotatable adjustment
   a brake pedal fitted in said pedal tube,
   a hydraulic operating cylinder on the mounting plate and conduits extending from the cylinder to the vehicle brake,
   and linkage means extending from the eccentric to the hydraulic operating cylinder.

6. An auxiliary brake pedal for a vehicle having a floor and an instrument panel, comprising;
   a mounting plate,
   a foot mounted on said mounting plate and resting on the floor,
   a tube, one end of the tube engaging the mounting plate,
   a threaded rod, slidably mounted in said tube,
   a nut on the threaded rod engaging the tube,
   a finger on said threaded rod engaging the instrument panel,
   a sleeve rotatably mounted on the mounting plate,
   said sleeve including an eccentric and a pedal tube,
   teeth on the engaging faces of said eccentric and pedal tube for rotatable adjustment of the pedal tube relative to said eccentric,
   a hydraulic operating cylinder on the mounting plate and conduits extending from the cylinder to the vehicle brake,
   and linkage means extending from the eccentric to the hydraulic operating cylinder.

7. An auxiliary brake pedal for a vehicle having a floor and an instrument panel, comprising;
   a mounting plate,
   a foot mounted on said mounting plate and resting on the floor,
   adjustable wedging means, one end of the wedging means engaging the mounting plate and the other end engaging the instrument panel,
   a sleeve rotatably mounted on the mounting plate,
   said sleeve including an eccentric and a pedal tube,
   means coupling said pedal tube and eccentric for rotatable adjustment,
   a brake pedal shank slidably mounted in the pedal tube,
   a hydraulic operating cylinder on the mounting plate and conduits extending from the cylinder to the vehicle brake,
and linkage means extending from the eccentric to the hydraulic operating cylinder.

8. An auxiliary brake pedal for a vehicle having a floor and an instrument panel, comprising;
a mounting plate,
a foot mounted on said mounting plate and resting on the floor,
a tube, one end of the tube engaging the mounting plate,
a threaded rod, slidably mounted in said tube,
a nut on the threaded rod engaging the tube,
a finger on said threaded rod engaging the instrument panel,
a sleeve rotatably mounted on the mounting plate, said sleeve including an eccentric and a pedal tube,
means coupling said pedal tube and eccentric for rotatable adjustment,
a brake pedal shank slidably mounted in the pedal tube,
a hydraulic operating cylinder on the mounting plate and conduits extending from the cylinder to the vehicle brake,
and linkage means extending from the eccentric to the hydraulic operating cylinder.

References Cited in the file of this patent
UNITED STATES PATENTS

| | | |
|---|---|---|
| 2,024,549 | Tarris | Dec. 17, 1935 |
| 2,207,228 | Seppman | July 9, 1940 |
| 2,694,946 | Vandal | Nov. 23, 1954 |
| 2,720,121 | Holum | Oct. 11, 1955 |